US012646028B2

(12) United States Patent
Scriven

(10) Patent No.: US 12,646,028 B2
(45) Date of Patent: Jun. 2, 2026

(54) AUTOMATED INGESTION OF CARRIER-AGNOSTIC PACKAGES AND DYNAMIC MIDMILE LOGISTICS ADJUSTMENTS

(71) Applicant: Saltbox, Inc., Atlanta, GA (US)

(72) Inventor: Lansing Tyler Scriven, Atlanta, GA (US)

(73) Assignee: Parsel, Inc., Atlanta, GA (US)

( * ) Notice: Subject to any disclaimer, the term of this patent is extended or adjusted under 35 U.S.C. 154(b) by 0 days.

(21) Appl. No.: 18/532,369

(22) Filed: Dec. 7, 2023

(65) Prior Publication Data

US 2025/0190926 A1      Jun. 12, 2025

(51) Int. Cl.
*G06Q 10/0836* (2023.01)
*G06Q 10/083* (2024.01)
*G06Q 10/0833* (2023.01)

(52) U.S. Cl.
CPC ..... *G06Q 10/0836* (2013.01); *G06Q 10/0833* (2013.01); *G06Q 10/08355* (2013.01)

(58) Field of Classification Search
None
See application file for complete search history.

(56) References Cited

U.S. PATENT DOCUMENTS

| | | | | |
|---|---|---|---|---|
| 11,144,868 B1 * | 10/2021 | McBride | ........... | G06Q 10/0834 |
| 2015/0371187 A1 * | 12/2015 | Irwin | ....................... | G07F 17/13 |
| | | | | 705/72 |
| 2018/0070753 A1 * | 3/2018 | Eveloff | .................. | H04W 4/025 |
| 2019/0005741 A1 * | 1/2019 | Klausner | ................. | G07F 17/42 |
| 2023/0196262 A1 * | 6/2023 | Hollenbeck | ........... | G06Q 10/08 |
| | | | | 705/333 |
| 2023/0237864 A1 * | 7/2023 | Lanzi | ................. | G07C 9/00571 |
| | | | | 705/339 |

* cited by examiner

*Primary Examiner* — Jeff Zimmerman
*Assistant Examiner* — Jorge G Del Toro-Ortega
(74) *Attorney, Agent, or Firm* — EVERSHEDS SUTHERLAND (US) LLP

(57) ABSTRACT

Systems and methods are disclosed for automated ingestion of carrier-agnostic packages and dynamic midmile logistics adjustments. In one embodiment, a package receptacle can include an access door and a controller. The controller may be configured to determine a first package identifier for a first package to be deposited into the package receptacle, determine that the first package identifier is associated with a first shipping carrier, cause the access door to be unlocked at a first time interval, and generate a first notification that a package for the first shipping carrier is present in the package receptacle. The controller may be configured to determine a second package identifier for a second package to be deposited into the package receptacle, determine that the second package identifier is associated with a second shipping carrier, and generate a second notification that a package for the second shipping carrier is present in the package receptacle.

18 Claims, 10 Drawing Sheets

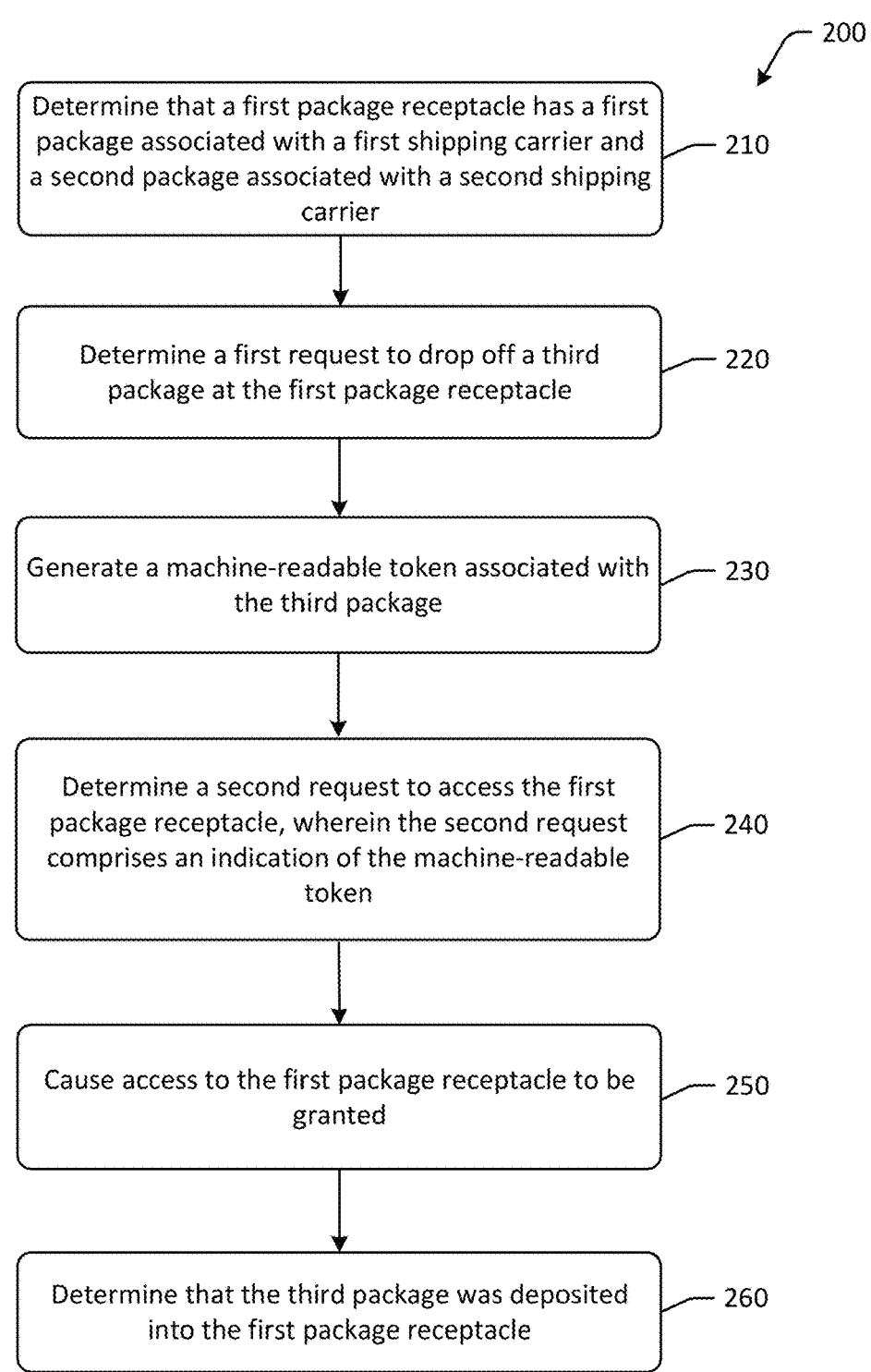

200

Determine that a first package receptacle has a first package associated with a first shipping carrier and a second package associated with a second shipping carrier — 210

Determine a first request to drop off a third package at the first package receptacle — 220

Generate a machine-readable token associated with the third package — 230

Determine a second request to access the first package receptacle, wherein the second request comprises an indication of the machine-readable token — 240

Cause access to the first package receptacle to be granted — 250

Determine that the third package was deposited into the first package receptacle — 260

FIG. 2

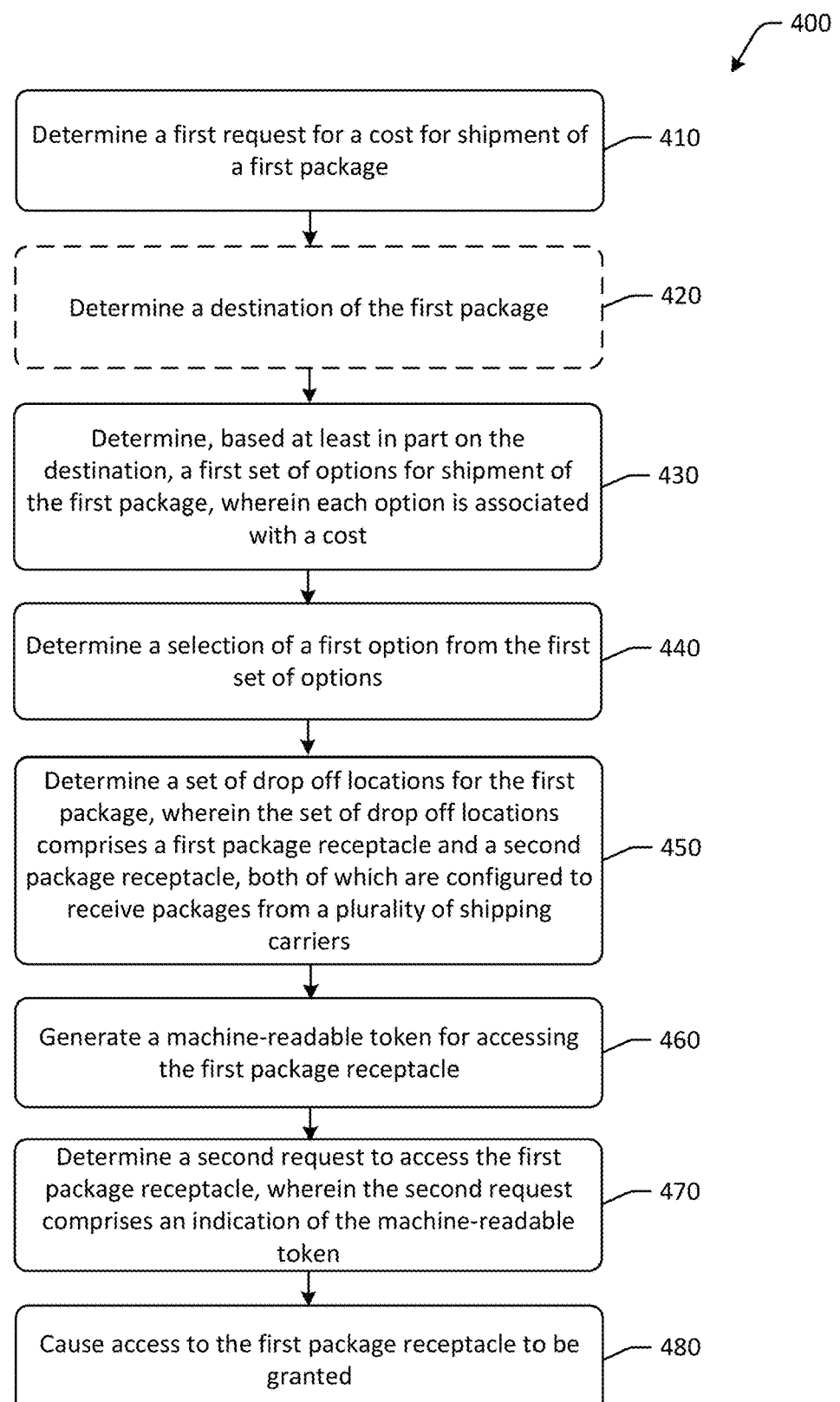

400

Determine a first request for a cost for shipment of a first package — 410

Determine a destination of the first package — 420

Determine, based at least in part on the destination, a first set of options for shipment of the first package, wherein each option is associated with a cost — 430

Determine a selection of a first option from the first set of options — 440

Determine a set of drop off locations for the first package, wherein the set of drop off locations comprises a first package receptacle and a second package receptacle, both of which are configured to receive packages from a plurality of shipping carriers — 450

Generate a machine-readable token for accessing the first package receptacle — 460

Determine a second request to access the first package receptacle, wherein the second request comprises an indication of the machine-readable token — 470

Cause access to the first package receptacle to be granted — 480

FIG. 4

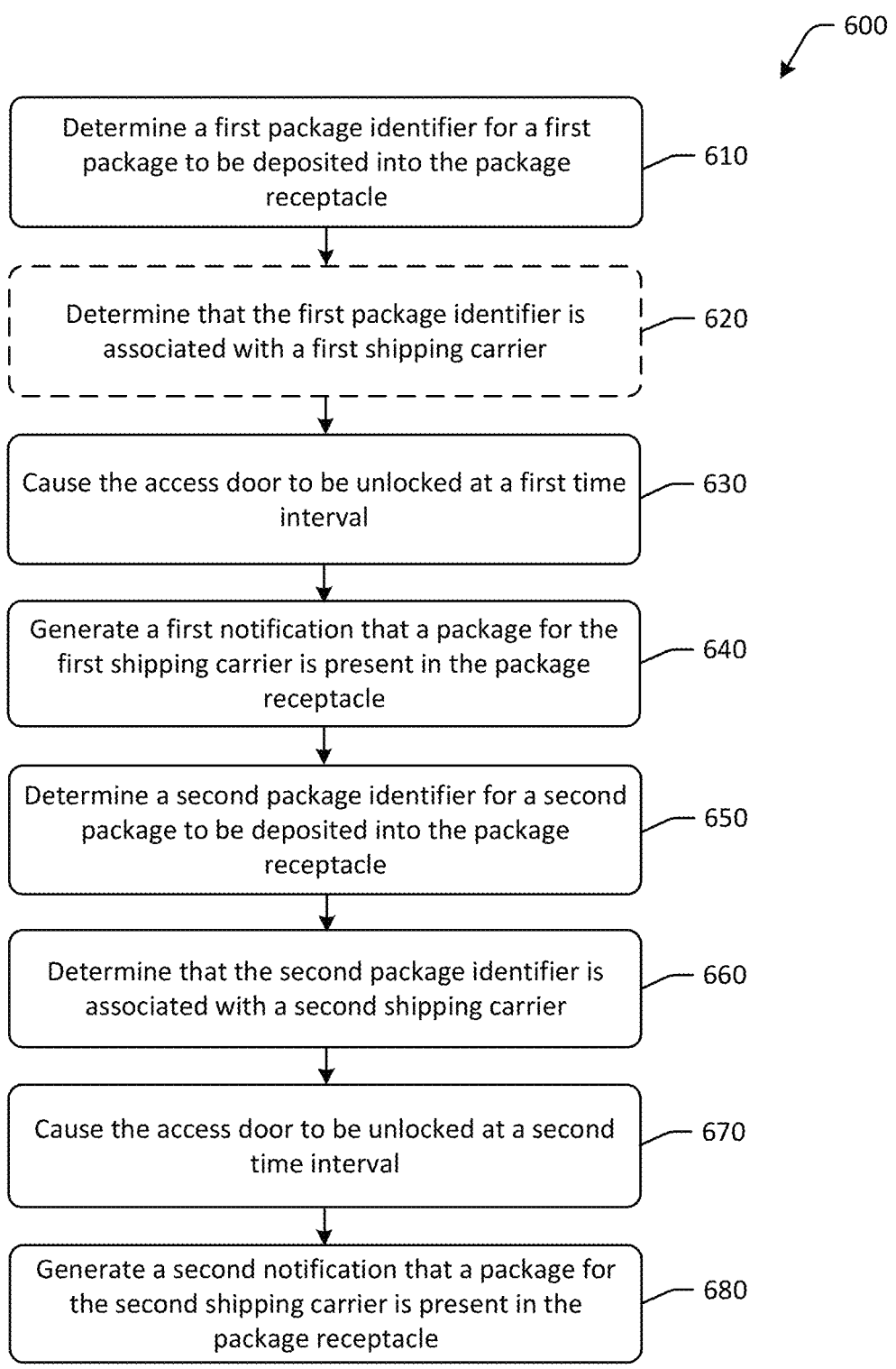

— 600

Determine a first package identifier for a first package to be deposited into the package receptacle — 610

Determine that the first package identifier is associated with a first shipping carrier — 620

Cause the access door to be unlocked at a first time interval — 630

Generate a first notification that a package for the first shipping carrier is present in the package receptacle — 640

Determine a second package identifier for a second package to be deposited into the package receptacle — 650

Determine that the second package identifier is associated with a second shipping carrier — 660

Cause the access door to be unlocked at a second time interval — 670

Generate a second notification that a package for the second shipping carrier is present in the package receptacle — 680

FIG. 6

AUTOMATED INGESTION OF CARRIER-AGNOSTIC PACKAGES AND DYNAMIC MIDMILE LOGISTICS ADJUSTMENTS

BACKGROUND

Shipping carriers may transport packages from one location, such as an origin, to another location, such as a destination. Certain shipping carriers may transport packages through midmile routes, or intermediate points, between an origin and a destination. For example, a regional shipping carrier may transport a package between two sortation facilities in different parts of a country. Shipping carriers may have shipping networks that allow for delivery to different destinations. Typically, a shipping carrier may be able to ingest into their network packages that are labeled with a shipping carrier-specific label, often times having a tracking identifier that is assigned by the shipping carrier. The tracking identifier allows a package to be tracked over the course of its delivery. However, shipping carriers may be unable to ingest packages that are labeled with a different shipping carrier's shipping label. For example, Shipping Carrier A may be unable to ingest packages having a shipping label or other tracking identifier for Shipping Carrier B. As a result, packages for different shipping carriers need to be delivered to different physical locations for ingestion by the specific shipping carrier. Such issues can be time consuming and problematic, both for businesses and consumers. Accordingly, automated ingestion of carrier-agnostic packages and dynamic midmile logistics adjustments may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 2 is a schematic illustration of an example process flow for automated ingestion of carrier-agnostic packages and dynamic midmile logistics adjustments in accordance with one or more example embodiments of the disclosure.

FIG. 4 is a schematic illustration of an example process flow for automated ingestion of carrier-agnostic packages and dynamic midmile logistics adjustments in accordance with one or more example embodiments of the disclosure.

FIG. 6 is a schematic illustration of an example process flow for automated ingestion of carrier-agnostic packages and dynamic midmile logistics adjustments in accordance with one or more example embodiments of the disclosure.

DETAILED DESCRIPTION

Overview

Figure 1A:
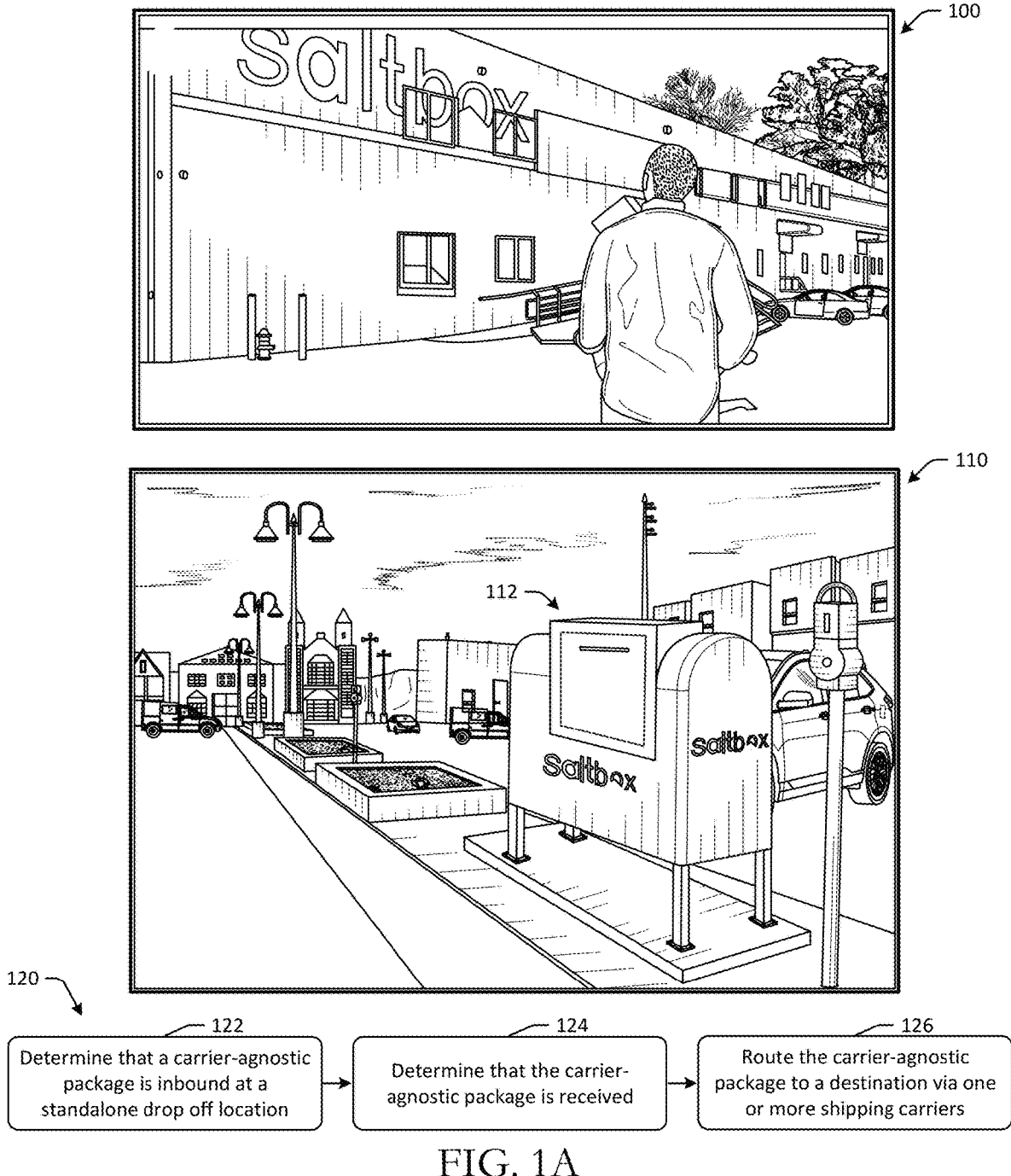
FIGS. 1A-1B are schematic illustrations of an example use case for automated ingestion of carrier-agnostic packages and dynamic midmile logistics adjustments in accordance with one or more example embodiments of the disclosure.

Shipping carriers can transport packages from an origin to a destination. In some instances, a package origin may be at a specific drop off facility or drop box associated with a specific shipping carrier. For example, United Parcel Service® may have a package drop box next to a separate package drop box for FedEx Corporation®. The shipping carrier may ingest the package and transport through its network to the package destination. However, for both commercial and consumer use cases, delivering packages to an origin or other point at which the package can be ingested by a specific shipping carrier may be cumbersome. For example, a consumer may have to transport a package to a shipping carrier facility, wait in line, purchase shipping, and so forth. If the consumer has another package that is to be shipped by another shipping carrier, such as a package containing items for return, the consumer has to transport the package to another drop box or facility associated with the other shipping carrier. This is because shipping carriers are unable to ingest or otherwise process packages having shipping labels associated with a different shipping carrier. In addition, the tracking identifiers used by certain shipping carriers may not be compatible or otherwise used by a different shipping carrier.

Moreover, certain business-to-business and business-to-consumer carriers may perform portions of package transport, but not necessarily ingest packages from individual consumers. In one example, a regional carrier may transport packages from a business or a sortation facility to another business or a delivery station. Such shipping carriers may be able to provide cost-effective rates for transportation services, but may be unable to ingest packages from consumers or non-business entities for a number of reasons, including end-user facing technology limitations, lack of physical drop off or package ingestion locations, and so forth. As a result, consumers and small businesses may therefore be unable to access the services provided by such shipping carriers.

Embodiments of the disclosure include automated ingestion of carrier-agnostic packages and dynamic midmile logistics adjustments. For example, some embodiments include carrier-agnostic drop off kiosks or drop boxes that are configured to accept packages associated with a plurality of different shipping carriers. Such drop boxes may facilitate reduced friction experienced by a user when delivering packages for ingestion to a shipping carrier. For example, the user may drop off all of their packages at a single drop off location instead of at multiple locations associated with different individual shipping carriers. In some embodiments, packages ingested at a particular carrier-agnostic drop box may be automatically sorted using mechanical systems disposed therein. In other embodiments, packages may be retrieved from a carrier-agnostic drop box and sorted at a sortation location, after which the packages may be ingested by the specific shipping carriers with which the packages are associated. Moreover, some embodiments may provide for carrier-agnostic shipping of packages, where a package may be delivered from its origin to destination by a plurality of different shipping carriers, where such determinations related to individual shipping carrier may be determined based at least in part on a particular routing plan for the package. In such instances, some embodiments may allow for generation of a package identifier, such as a Quick Response code or other machine-readable code, that is not associated with any particular shipping carrier. Instead, the package identifier may be associated with multiple shipping carriers, each of which may assign their own tracking identifies. However, a shipper of the package may use the package identifier to track the package regardless of which shipping carrier is in possession of the package.

This disclosure relates to, among other things, devices, systems, methods, computer-readable media, techniques, and methodologies for automated ingestion of carrier-agnostic packages and dynamic midmile logistics adjustments. In some instances, machine learning (e.g., deep neural networks, etc.) may be used to determine optimized routing for packages to increase delivery speed and/or reduce shipping costs (e.g., which shipping carrier should handle which portion of a delivery route, etc.), determine whether packages should be transported from one facility to another prior to being injected into a specific shipping carrier shipping network (e.g., package received at Location A and is transported to Location B internally prior to being injected into Shipping Carrier A network, etc.), and so forth. A feedback loop may be used to continually improve accuracy of the machine learning model(s), which may include feedback from customers, operators, or other users.

Figure 1B:
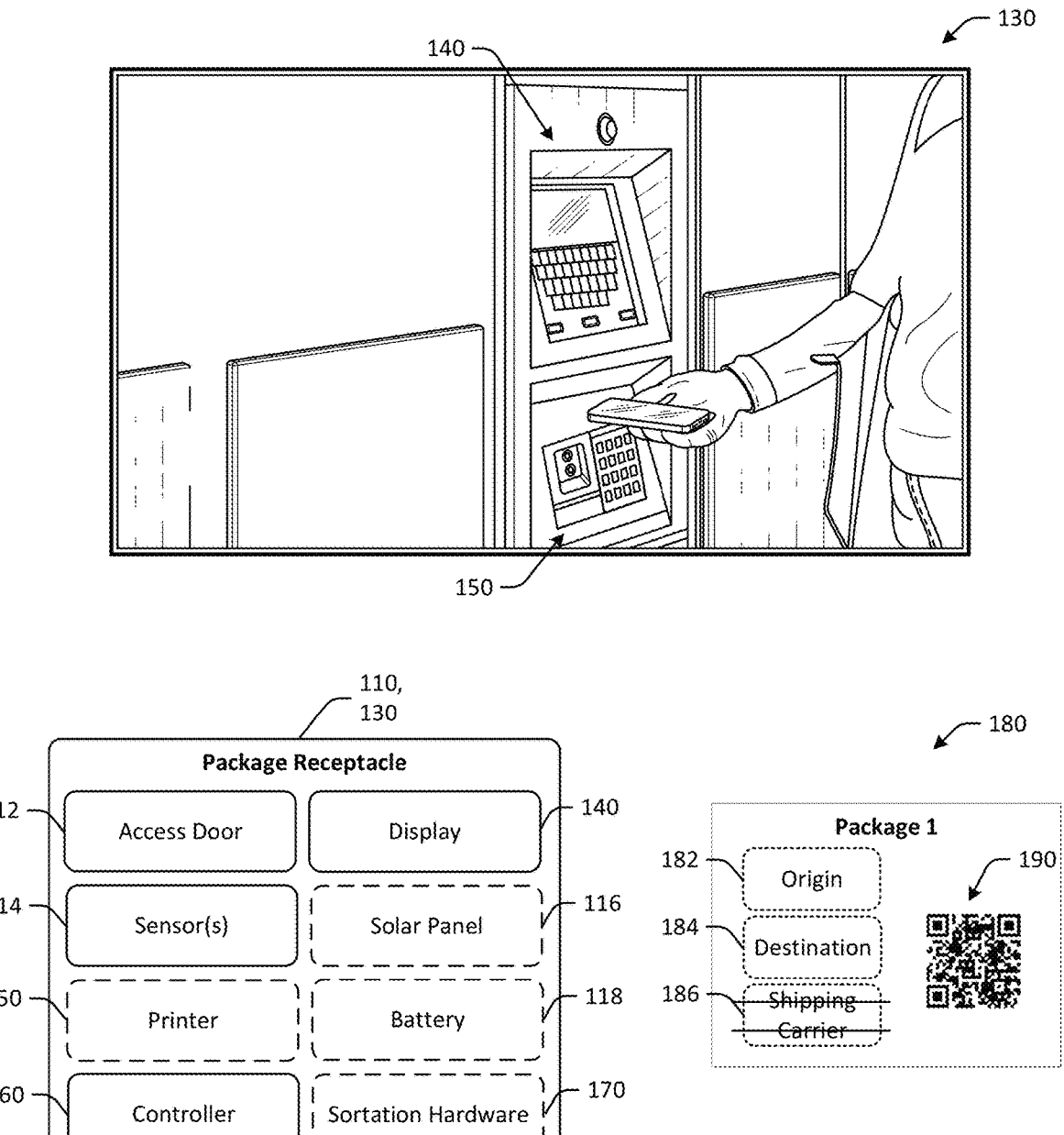

Referring to FIGS. 1A-1B, an example use case 100 for automated ingestion of carrier-agnostic packages and dynamic midmile logistics adjustments in accordance with one or more example embodiments of the disclosure. FIG. 1A depicts a user dropping off multiple packages associated with multiple shipping carriers at a single drop off location, and FIG. 1B depicts an example carrier-agnostic drop box and package label. Other embodiments may have different configurations.

In FIG. 1A, at a first instance 100, a user may have multiple packages, each of which is associated with a different shipping carrier. For example, a first package may be associated with United Parcel Service®, a second package may be associated with FedEx Corporation®, a third package may be associated with the United States Postal Service, and so forth.

The user may approach a carrier-agnostic drop box 110 and may deposit all of the packages into the carrier-agnostic drop box 110, even though the packages are associated with different shipping carriers. For example, the carrier-agnostic drop box 110 may have an access door 112 that allows the user to deposit the packages into the carrier-agnostic drop box 110. In some embodiments, as discussed at least with respect to FIG. 1B, some of the packages deposited into the carrier-agnostic drop box 110 may be carrier-agnostic packages. In such instances, the carrier-agnostic packages may be labeled using a package identifier that may be associated with multiple shipping carriers and/or may not be associated with any particular shipping carrier.

An example process flow 120 for the handling of packages at the carrier-agnostic drop box 110 is depicted in FIG. 1A. At block 122, a computer system, such as a remote server in communication with the carrier-agnostic drop box 110, may determine that a carrier-agnostic package is inbound at a standalone drop off location, such as the carrier-agnostic drop box 110. At block 124, the remote server may determine that the carrier-agnostic package is received. At block 126, the remote server may route the carrier-agnostic package to its destination via one or more shipping carriers. This may provide flexibility in routing and delivery of the carrier-agnostic package by allowing for the aggregation of different shipping carriers providing transportation along discrete portions of a delivery route, while still allowing users to track a package delivery status and location.

In FIG. 1B, another embodiment of a carrier-agnostic drop box 130 is depicted in close-up view. The carrier-agnostic drop box 130 may be a smart drop box in that the carrier-agnostic drop box 130 may control access to the drop box via one or more authentication features. For example, the carrier-agnostic drop box 130 may include hardware to determine one or more package identifiers for packages that are to be deposited. The carrier-agnostic drop box 130 may unlock an access door after authenticating the packages and/or the user making the deposit.

The carrier-agnostic drop box 130 may include a display 140 configured to receive touch input and/or present information to a user. The carrier-agnostic drop box 130 may include a printer 150 that may allow users to print a shipping label 180 for a package at the carrier-agnostic drop box 130. The shipping label 180 may optionally include an origin 182, such as a return address for the user, a destination address 184, and an optional carrier-agnostic package identifier 190. The carrier-agnostic package identifier 190 may not be associated with any particular shipping carrier 186 at the time the shipping label 180 is printed (as represented by the lines through the shipping carrier 186 in the example of FIG. 1B). Instead, the carrier-agnostic package identifier 190 may be associated with different shipping carriers as the package makes its way to the destination. Such routing may not only decrease delivery times by optimizing for shipping carriers having capacity, but may also decrease cost by allowing for use of the lowest cost shipping carriers for different portions of transport along the delivery route between origin and destination.

In some embodiments, the carrier-agnostic drop box(es) 110, 130 as described herein may include the access door 112 that may be optionally unlocked based at least in part on authentication of a package and/or user depositing packages into the carrier-agnostic drop box 130. The carrier-agnostic drop box 130 may therefore include one or more sensors 114, such as optical sensors, barcode sensors, camera sensors, Bluetooth sensors, and/or other types of sensors. The sensor 114 may be configured to detect a machine-readable identifier, such as a QR code, that a user presents to gain access to the carrier-agnostic drop box 130. The QR code may be associated with a number of packages and/or corresponding shipping carriers that the user is depositing into the carrier-agnostic drop box 130. The remote server may determine that the packages have been deposited into the carrier-agnostic drop box 130, and may initiate one or more follow-up tasks, such as generating notifications, triggering pickups at the carrier-agnostic drop box 130, and/or other tasks. The sensor 114 may be used to approve access to the carrier-agnostic drop box 130 and/or unlock the access door 112 of the carrier-agnostic drop box 130.

In some embodiments, the QR code may be a package identifier. However, package identifiers may not necessarily be shipping carrier identifiers, such as shipping carrier barcodes. In such cases, the remote server may determine, based at least in part on the package identifier (e.g., the QR code scanned by a user to access the carrier-agnostic drop box 130, etc.), a destination address of a package, and may determine a barcode associated with the first shipping carrier and the destination address. The barcode may then be printed on a shipping label via the printer 150. Such use cases may be applicable where a single shipping carrier will handle delivery of the package to the final destination.

The carrier-agnostic drop box 130 may include the optional printer 150 to print shipping labels for packages. The carrier-agnostic drop box 130 may include a local controller 160 to facilitate certain actions, such as unlocking of the access door (e.g., package data may be wirelessly communicated to one or more remote servers to determine whether to grant access to the carrier-agnostic drop box 130, etc.), communicating with a remote server, and so forth. In some embodiments, the carrier-agnostic drop box 130 may include one or more optional solar panels 116 to power the sensors, controller, and/or other hardware. The carrier-agnostic drop box 130 may include one or more rechargeable batteries 118 that power the local controller or computer system and other components.

In some embodiments, the carrier-agnostic drop box 130 may include sortation hardware 170 that may be disposed within the housing of the carrier-agnostic drop box 130. The sortation hardware 170 may determine that a particular package is associated with a particular shipping carrier, for example based on a shipping label that was already applied to the package, and may route the package to a tote or container designated for pickup by that particular shipping carrier. In such embodiments, different shipping carriers may have different individual containers in which their packages may be aggregated automatically by the carrier-agnostic drop box 130. In one example, the controller may cause a first package to be routed to a first container in the carrier-agnostic drop box 130, and may cause a second package to be routed to a second container in the carrier-agnostic drop box 130, where the first container is associated with a first shipping carrier and the second container is associated with a second shipping carrier. In one embodiment, the carrier-agnostic drop box 130 may have multiple access doors, each of which, or some of which, may be associated with individual shipping carriers.

When an operator for a particular shipping carrier arrives at the carrier-agnostic drop box 130 to retrieve packages to be ingested by the shipping carrier, the controller of the carrier-agnostic drop box 130 may determine a first access request to access the package receptacle, the first access request having a first shipping carrier identifier. The controller may permit access to the particular container associated with the shipping carrier. For example, the carrier-agnostic drop box 130 may have multiple doors on a rear side, where different containers are accessible via the different doors, and only certain doors are unlocked when an operator from a particular shipping carrier arrives at the carrier-agnostic drop box 130 to retrieve packages.

Accordingly, the carrier-agnostic drop box 130 may allow users to deposit packages from any number of different shipping carriers. Moreover, the carrier-agnostic drop box 130 may ingest packages that are not associated with any particular shipping carriers. In addition, the carrier-agnostic drop box 130 may include a printer that prints shipping labels for packages, where the shipping labels may include a machine-readable code that can be associated with different shipping carriers at different points in time. The carrier-agnostic drop boxes can be accessible 24 hours a day and can be standalone package receptacles disposed in any environment, including outdoors environments, so as to provide user convenience.

In one embodiment, the carrier-agnostic drop box 130 may be a package receptacle that has a sensor configured to determine a first package identifier, a solar panel, and a display configured to receive touch input. The package receptacle may include an access door, a printer configured to generate a shipping label having a destination address and a machine-readable code, such as a barcode, and a controller. The controller may include memory having computer-executable instructions, and one or more computer processors configured to access the memory and execute the computer-executable instructions. For example, the controller may determine a first request to unlock the access door, where the first request includes a first user identifier, and may determine that the first user identifier is authorized to access the package receptacle.

Example embodiments of the disclosure provide a number of technical features or technical effects. For example, in accordance with example embodiments of the disclosure, certain embodiments of the disclosure may automatically manage access to carrier-agnostic drop boxes. Certain embodiments may be configured to ingest packages intended for multiple shipping carriers. Some embodiments allow for aggregation of different shipping carriers to perform different discrete portions of a delivery route, with dynamic adjustments while a package is in transit. As a result of improved functionality, manual efforts may be redirected to other tasks. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

FIG. 2 depicts an example process flow 200 for automated ingestion of carrier-agnostic packages and dynamic midmile logistics adjustments in accordance with one or more example embodiments of the disclosure. While example embodiments of the disclosure may be described in the context of carrier-agnostic packages, it should be appreciated that the disclosure is more broadly applicable to any type of package. Some or all of the blocks of the process flows in this disclosure may be performed in a distributed manner across any number of devices. The operations of the process flow 200 may be optional and may be performed in a different order.

The process flow 200 may be executed by one or more remote servers or computer systems, such as that depicted in the example of FIG. 10, where such remote servers may be in communication with one or more carrier-agnostic package receptacles or drop boxes. In other embodiments, the process flow 200 may be executed at least partially locally at a package receptacle, such as by a controller at a package receptacle.

At block 200 of the process flow 200, computer-executable instructions stored on a memory of a device, such as a remote server or a user device, may be executed to determine that a first package receptacle has a first package associated with a first shipping carrier and a second package associated with a second shipping carrier. For example, a remote server may determine that a first package receptacle has a first package associated with a first shipping carrier and a second package associated with a second shipping carrier. The remote server may be in communication with a plurality of carrier-agnostic package receptacles, and may determine or otherwise monitor inventory of deposited packages for individual package receptacles. The remote server may determine that the first package receptacle has a first package associated with a first shipping carrier, such as Shipping Carrier A, and a second package associated with a second shipping carrier, such as Shipping Carrier B. The first shipping carrier and the second shipping carrier may be different shipping carriers, and both packages may have been deposited into the same carrier-agnostic package receptacle.

At block 220 of the process flow 200, computer-executable instructions stored on a memory of a device, such as the remote server, may be executed to determine a first request to drop off a third package at the first package receptacle. For example, the remote server may determine a first request to drop off a third package at the first package receptacle. A user may initiate a request to drop off the third package prior to arriving at the first package receptacle, such as via a mobile device user interface, or may initiate the request via a display or other hardware at the first package receptacle.

At block 230 of the process flow 200, computer-executable instructions stored on a memory of a device, such as the remote server, may be executed to generate a machine-readable token associated with the third package. For example, the remote server may generate a machine-readable token associated with the third package. The machine-readable token may be associated with one or more of a user identifier of a shipper of the third package, a destination of the third package, a shipping carrier that is to handle the third package for delivery, and/or other or different metadata. The machine-readable token may be any suitable machine-readable code, such as a QR code, a barcode, an NFC or Bluetooth data package, and/or other forms of machine-readable tokens. The machine-readable token may be used to access the first package receptacle and/or other carrier-agnostic package receptacles. In some embodiments, the machine-readable token may be used to trigger printing of a shipping label for the third package at the first package receptacle.

In one example, the machine-readable token may be used to route the third package along at least a portion of the delivery route from the first package receptacle to the destination of the package. For instance, the machine-readable token may not associated with any shipping carrier at the time of generation and/or printing. Instead, the machine-readable token may be associated with different shipping carriers at different points in time. For example, the third package may be transported along a portion of a delivery route internally by an operator of the first package receptacle prior to being injected into a shipping carrier network, at which time the machine-readable token may optionally be associated with a tracking identifier for the particular shipping carrier.

At block 240, computer-executable instructions stored on a memory of a device, such as the remote server, may be executed to determine a second request to access the first package receptacle, wherein the second request comprises an indication of the machine-readable token. For example, the remote server may determine a second request to access the first package receptacle, wherein the second request comprises an indication of the machine-readable token. The second request may be received from the first package receptacle (or another package receptacle in the network), where the second request may be triggered by a user scanning the machine-readable token at the first package receptacle. The remote server may determine the second request, authenticate the machine-readable token, and determine whether to grant access to the first package receptacle.

At block 250, computer-executable instructions stored on a memory of a device, such as the remote server, may be executed to cause access to the first package receptacle to be granted. For example, the remote server may cause access to the first package receptacle to be granted. The remote server may determine that the machine-readable token is valid and/or authenticated, and may determine a number of packages that are to be deposited into the first package receptacle based at least in part on the machine-readable token. The remote server may send a signal to the controller of the first package receptacle to unlock an access door or otherwise provide access to the first package receptacle. In some embodiments, the controller of the first package receptacle may determine whether to grant access locally.

At block 260, computer-executable instructions stored on a memory of a device, such as the remote server, may be executed to determine that the third package was deposited into the first package receptacle. For example, the remote server may determine that the third package was deposited into the first package receptacle. The remote server may receive an indication from the first package receptacle that the access door was opened and closed and may infer receipt of the third package, or may otherwise receive an indication from the first package receptacle that the third package was deposited into the first package receptacle. In some embodiments, the first package receptacle may include a weight scale disposed in the access door or another portion of the package receptacle (such as at the bottom of the package receptacle, where a total weight of all deposited packages can be measured and incremental differences can be determined, etc.), and an estimated weight of the third package may be determined and sent to the remote server.

The remote server may therefore determine that that third package has been deposited into the first package receptacle. The remote server may generate a pickup notification for an operator to retrieve the first package, the second package, and the third package from the first package receptacle. Such pickup notifications may be time-based, capacity-based (e.g., when the first package receptacle has a certain amount of remaining capacity, etc.), delivery time-based (e.g., overnight packages may trigger pickup notifications immediately, etc.), and so forth. For example, the remote server may determine that the first package receptacle is at a threshold capacity, such as 75% full, and may generate a pickup notification for the first package receptacle.

When packages have been picked up from the first package receptacle, the remote server may determine that the first package has been retrieved from the first package receptacle, and may optionally generate a notification indicating the first package has been retrieved. The notification may be presented to the shipper via a mobile application notification, message, or other form of notification.

For instances where the third package is not associated with a particular shipping carrier at the time it is deposited into the first package receptacle, the remote server may generate a notification to an operator of the first package receptacle indicating that the third package is not associated with a particular shipping carrier. For example, in some instances, the operator of the first package receptacle may present a shipping cost for delivery of the third package, where the shipping cost is based on handling of the third package by multiple shipping carriers, which may lead to reduced overall cost to the shipper. In such instances, the remote server may determine a third package identifier (which may be the same or different from the machine-readable token) for the third package to be deposited into the package receptacle, and may determine that the third package identifier is not associated with a shipping carrier. The remote server may generate a notification that the third package identifier is not associated with a shipping carrier, such that the third package can be assigned a shipping plan or route as discussed herein, and is not immediately injected into the shipping carrier network for a particular shipping carrier.

For direct pickups from package receptacles, where injection of packages into shipping carrier networks occurs at package receptacles, the remote server may determine that a second package receptacle has a third package associated with the first shipping carrier, and may generate a route for the first shipping carrier that includes a first location of the first package receptacle and a second location of the second package receptacle, such that locations at which there are no packages for the first shipping carrier can be bypassed.

Figure 3:
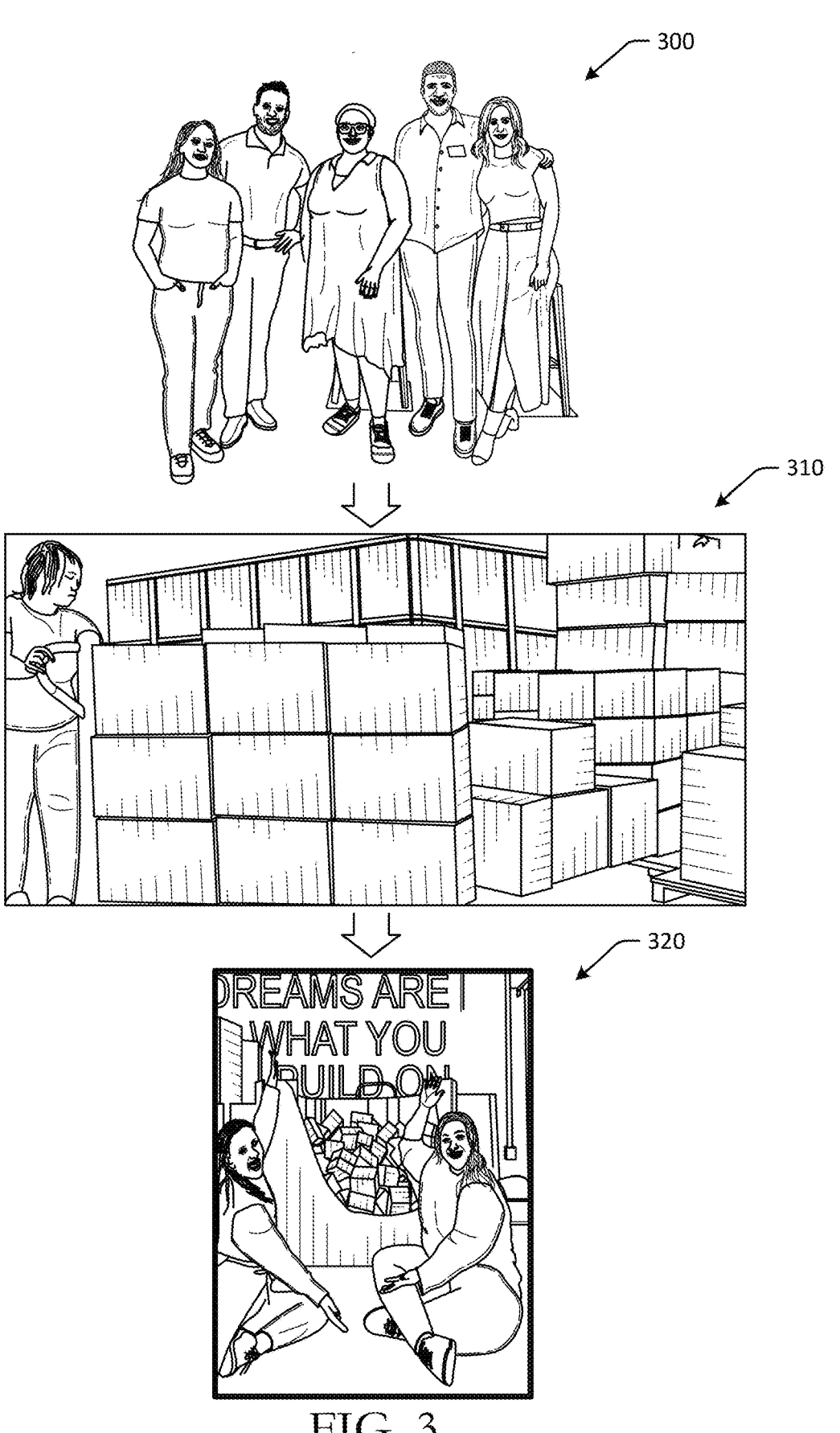
FIG. 3 is a schematic illustration of example pre-injection package handling in accordance with one or more example embodiments of the disclosure.

FIG. 3 is a schematic illustration of example pre-injection package handling in accordance with one or more example embodiments of the disclosure. Other embodiments may have different architectures and/or include additional, fewer, or different components.

In FIG. 3, packages may be collected from a number of carrier-agnostic drop boxes and/or other locations and returned to a sort facility. In one example, one or more operators 300 may sort the packages by shipping carrier. Aggregated packages 310 may be injected into the different respective shipping carrier shipping networks. In some embodiments, the packages may be aggregated into Gaylords 320, pallets, or other containers. The aggregated packages may be injected into the respective shipping networks of different shipping carriers. In some embodiments, sortation of packages may be performed via mechanical equipment at the package receptacles, in which case injection can occur by triggering shipping carrier pickups of packages directly at the package receptacle.

FIG. 4 is a schematic illustration of an example process flow for automated ingestion of carrier-agnostic packages and dynamic midmile logistics adjustments in accordance with one or more example embodiments of the disclosure. While example embodiments of the disclosure may be described in the context of carrier-agnostic packages, it should be appreciated that the disclosure is more broadly applicable to any type of package. Some or all of the blocks of the process flows in this disclosure may be performed in a distributed manner across any number of devices. The operations of the process flow 400 may be optional and may be performed in a different order.

The process flow 400 may be executed by one or more remote servers or computer systems, such as that depicted in the example of FIG. 10, where such remote servers may be in communication with one or more carrier-agnostic package receptacles or drop boxes. In other embodiments, the process flow 400 may be executed at least partially locally at a package receptacle, such as by a controller at a package receptacle.

At block 410 of the process flow 400, computer-executable instructions stored on a memory of a device, such as a remote server or a user device, may be executed to determine a first request for a cost for shipment of a first package. For example, the remote server may determine a first request for a cost for shipment of a first package. The first request may be received via input at a mobile application, via one or more application programming interfaces, via input at the display of a package receptacle, and/or another source.

At optional block 420 of the process flow 400, computer-executable instructions stored on a memory of a device, such as the remote server, may be executed to determine a destination of the first package. For example, the remote server may determine a destination of the first package. In some embodiments, the first request may include metadata such as an origin or drop off location of the first package, a destination of the first package, dimensions or estimated dimensions of the first package, weight or estimated weight of the first package, an image of the package, and so forth. In some instances, information related to the dimensions and/or weight of the package may be determined using computer vision processing of an image of the package.

At block 430 of the process flow 400, computer-executable instructions stored on a memory of a device, such as the remote server, may be executed to determine, based at least in part on the destination, a first set of options for shipment of the first package, wherein each option is associated with a cost. For example, the remote server may determine, based at least in part on the destination, a first set of options for shipment of the first package, wherein each option is associated with a cost. The remote server may determine cost options for shipment of the first package. Different options may be determined, including options for different shipping carriers, options for different delivery speeds, and so forth. In some embodiments, an option for delivery using more than one shipping carrier may be presented, and therefore the option may be presented without identification of a specific shipping carrier. Accordingly, for some options, the cost to ship the first package can be presented without identification of a shipping carrier.

At block 440, computer-executable instructions stored on a memory of a device, such as a remote server, may be executed to determine a selection of a first option from the first set of options. For example, the remote server may determine a selection of a first option from the first set of options. A user may select a first option via a mobile device, a display at a package receptacle, or using another device.

At block 450, computer-executable instructions stored on a memory of a device, such as a remote server, may be executed to determine a set of drop off locations for the first package, wherein the set of drop off locations comprises a first package receptacle and a second package receptacle, and wherein the first package receptacle and the second package receptacle both are configured to receive packages from a plurality of shipping carriers. For example, the remote server may determine a set of drop off locations for the first package, wherein the set of drop off locations comprises a first package receptacle and a second package receptacle, and wherein the first package receptacle and the second package receptacle both are configured to receive packages from a plurality of shipping carriers. The package receptacles may be carrier-agnostic package receptacles that can receive packages for any number of shipping carriers. The remote server may determine the set of drop off locations based at least in part on user location, user preference, proximity to a sortation facility, and/or other factors.

In some instances, drop off locations for the first package may be determined based at least in part on the shipping carrier selected by the user for shipment of the first package (in instances where the shipper did not select carrier-agnostic shipping). For example, the remote server may determine that a first drop off location or drop box has additional packages associated with a particular shipping carrier, and may therefore provide the first drop off location as an option for the user to deposit the first package. If the first drop off location is greater than a certain distance from the user location or preferred drop off location, the remote server may determine a discount to the shipping cost to incentivize the user to drop off the first package at the drop off location. This may facilitate streamlined sortation of packages for the shipping carrier as the shipping carrier may not have to make an additional stop to retrieve the first package from a different package receptacle.

Accordingly, the remote server may determine, at a first time interval, a request for a drop off location for the third package, where the third package in this example is associated with a first shipping carrier. The request may include a geographic location. The remote server may determine that a second package receptacle is nearer to the geographic location than the first package receptacle, and may determine that the second package receptacle does not have a package associated with the first shipping carrier at the first time interval. The remote server may determine that the first package receptacle is the drop off location, and may optionally determine a price adjustment value for shipment of the third package.

At block 460, computer-executable instructions stored on a memory of a device may be executed to generate a machine-readable token for accessing the first package receptacle. For example, the remote server may generate a machine-readable token for accessing the first package receptacle. The machine-readable token may be associated with one or more of a user identifier of a shipper of the first package, a destination of the first package, a shipping carrier that is to handle the first package for delivery, and/or other or different metadata. The machine-readable token may be any suitable machine-readable code, such as a QR code, a barcode, an NFC or Bluetooth data package, and/or other forms of machine-readable tokens. The machine-readable token may be used to access the first package receptacle. In some embodiments, the machine-readable token may be used to trigger printing of a shipping label for the first package at the first package receptacle. The user may present the machine-readable token at the first package receptacle to deposit the first package.

In one example, the machine-readable token may be used to route the first package along at least a portion of the delivery route from the first package receptacle to the destination of the package. For instance, the machine-readable token may not associated with any shipping carrier at the time of generation and/or printing. Instead, the machine-readable token may be associated with different shipping carriers at different points in time. For example, the first package may be transported along a portion of a delivery route internally by an operator of the first package receptacle prior to being injected into a shipping carrier network, at which time the machine-readable token may optionally be associated with a tracking identifier for the particular shipping carrier.

At block 470, computer-executable instructions stored on a memory of a device, such as a remote server, may be executed to determine a second request to access the first package receptacle, wherein the second request comprises an indication of the machine-readable token. For example, the remote server may determine a second request to access the first package receptacle, wherein the second request comprises an indication of the machine-readable token. The second request may be received from the first package receptacle, where the second request may be triggered by a user scanning the machine-readable token at the first package receptacle. The remote server may determine the second request, authenticate the machine-readable token, and determine whether to grant access to the first package receptacle.

At block 480, computer-executable instructions stored on a memory of a device may be executed to cause access to the first package receptacle to be granted. For example, the remote server may cause access to the first package receptacle to be granted. The remote server may determine that the machine-readable token is valid and/or authenticated, and may determine a number of packages that are to be deposited into the first package receptacle based at least in part on the machine-readable token. The remote server may send a signal to the controller of the first package receptacle to unlock an access door or otherwise provide access to the first package receptacle. In some embodiments, the controller of the first package receptacle may determine whether to grant access locally.

Figure 5:
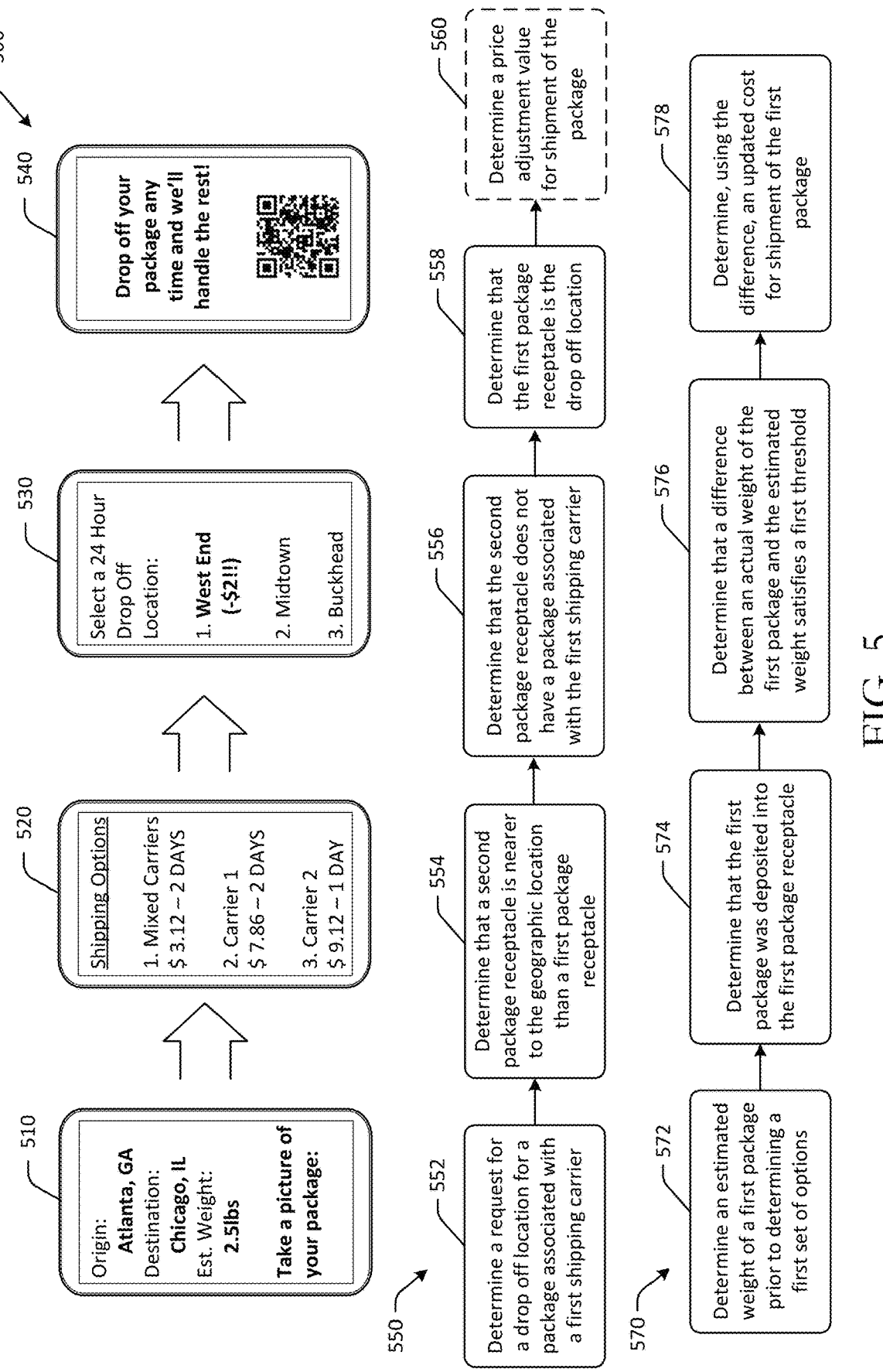
FIG. 5 is a schematic illustration of example user interfaces and process flows for package intake in accordance with one or more example embodiments of the disclosure.

FIG. 5 is a schematic illustration of example user interfaces 500 and process flows for package intake in accordance with one or more example embodiments of the disclosure. One or more of the operations of FIG. 5 may be performed at a client device and/or remote server in some embodiments. One or more of the operations of the process flows may be optional and may be performed in any order or at least partially concurrently in some embodiments.

In the example user interfaces 500, at a first instance 510, a user may input various information with respect to shipment of a package. For example, the user may input an origin of the package, a destination of the package, an estimated weight of the package, estimated dimensions of the package, and/or other information. In some instances, a user may take a picture or otherwise capture an image of the package to be shipped, and the user device and/or a remote server may determine one or more estimated dimensions and/or an estimated weight of the package using the image(s). For example, the remote server may determine an image of the package, and generate, using the image, at least one estimated dimension of the first package. The remote server may determine the first set of options for shipping based at least in part on the destination and the at least one estimated dimension.

At a second instance 520, one or more shipping options may be presented to the user. The shipping options may include carrier-agnostic shipping of the package (where any number of shipping carriers may handle the package for portions of a delivery route, etc.), particular shipping carriers, corresponding costs, estimated delivery times, and so forth. The user may make a selection of a shipping option via the user device and/or a display at a package receptacle.

At a third instance 530, one or more drop off locations may be presented at which the user can drop off the package regardless of the associated shipping carrier. The drop off locations may be carrier-agnostic drop boxes or other drop off locations. In some embodiments, drop off locations that may be relatively farther from the user may be selected for a discount to shipping costs, such as in instances where the package receptacle has other packages associated with the same shipping carrier.

At a fourth instance 540, a machine-readable token may be generated and presented at the user interface, where the machine-readable token may be used to access the selected drop off location and/or other drop off locations. Use of the machine-readable token may trigger an indication that the package has been deposited into the corresponding package receptacle.

A process flow 550 may be executed by one or more remote servers and/or controllers of package receptacles. At block 552, a remote server may determine a request for a drop off location for a package associated with a first shipping carrier. At block 554, the remote server may determine that a second package receptacle is nearer to the geographic location of the user than a first package receptacle. For example, the Midtown drop off location may be closer to the user in the example of FIG. 5 than the West End location. At block 556, the remote server may determine that the second package receptacle does not have a package associated with the first shipping carrier, or the shipping carrier selected by the user. At block 558, the remote server may determine that the first package receptacle is the drop off location. For example, the user may select the first package receptacle, or the West End location. At optional block 560, the remote server may determine a price adjustment value for shipment of the package, so as to incentivize the user to use the first drop off location even though it may be further from the user location.

A process flow 570 may be executed by one or more remote servers and/or controllers of package receptacles. At block 572, the remote server may determine an estimated weight of a first package prior to determining the first set of options for shipment of the first package. At block 574, the remote server may determine that the first package was deposited into the first package receptacle. At block 576, the remote server may determine that a difference between an actual weight of the first package and the estimated weight satisfies a first threshold. For example, a weight of the package may be more than 15% heavier than an estimated weight of the package. Other threshold values, including absolute values (e.g., 2 pounds, 4 pounds, etc.), may be used as thresholds. At block 578, the remote server may determine, using the difference, an updated cost for shipment of the first package. In this manner, costs may be adjusted based on actual package weights that are materially different than estimated weights.

FIG. 6 is a schematic illustration of an example process flow 600 for automated ingestion of carrier-agnostic packages and dynamic midmile logistics adjustments in accordance with one or more example embodiments of the disclosure. While example embodiments of the disclosure may be described in the context of carrier-agnostic packages, it should be appreciated that the disclosure is more broadly applicable to any type of package. Some or all of the blocks of the process flows in this disclosure may be performed in a distributed manner across any number of devices. The operations of the process flow 600 may be optional and may be performed in a different order.

The process flow 600 may be executed by one or more remote servers or computer systems, such as that depicted in the example of FIG. 10, where such remote servers may be in communication with one or more carrier-agnostic package receptacles or drop boxes. In other embodiments, the process flow 600 may be executed at least partially locally at a package receptacle, such as by a controller at a package receptacle.

At block 610 of the process flow 600, computer-executable instructions stored on a memory of a device, such as a remote server or a user device, may be executed to determine a first package identifier for a first package to be deposited into the package receptacle. For example, a remote server may determine a first package identifier for a first package to be deposited into the package receptacle. The remote server may receive, from a controller at a package receptacle, an indication of a first package identifier for a first package to be deposited into the package receptacle. The indication of the first package identifier may be based at least in part on a machine-readable token, such as a QR code, scanned at the package receptacle. In some embodiments, the first package identifier may be a barcode or tracking identifier associated with a particular shipping carrier.

At optional block 620 of the process flow 600, computer-executable instructions stored on a memory of a device, such as a remote server, may be executed to determine that the first package identifier is associated with a first shipping carrier. For example, the remote server may determine that the first package identifier is associated with a first shipping carrier. In some instances, a user may select a certain shipping carrier when shipping a package and/or a package may already be labeled with a certain shipping carrier when deposited into the package receptacle. The shipping carrier may therefore be associated with the machine-readable token or first package identifier.

At block 630 of the process flow 600, computer-executable instructions stored on a memory of a device, such as a remote server, may be executed to cause the access door to be unlocked at a first time interval. For example, the remote server may cause the access door to be unlocked at a first time interval. The remote server may determine that the first package is authorized to be deposited into the package receptacle, and may cause the access door to be unlocked. The remote server may send a signal to the package receptacle to unlock the access door or otherwise provide access for a user to deposit the first package.

At block 640 of the process flow 600, computer-executable instructions stored on a memory of a device, such as the remote server, may be executed to generate a first notification that a package for the first shipping carrier is present in the package receptacle. For example, the remote server may generate a first notification that a package for the first shipping carrier is present in the package receptacle. The first notification may be transmitted to an operator of the package receptacle, the shipper, and/or the first shipping carrier.

At block 650 of the process flow 600, computer-executable instructions stored on a memory of a device, such as a remote server, may be executed to determine a second package identifier for a second package to be deposited into the package receptacle. For example, the remote server may determine a second package identifier for a second package to be deposited into the package receptacle. The remote server may receive, from a controller at a package receptacle, an indication of a second package identifier for a second package to be deposited into the package receptacle. The indication of the second package identifier may be based at least in part on a machine-readable token, such as a QR code, scanned at the package receptacle. In some embodiments, the second package identifier may be a barcode or tracking identifier associated with a particular shipping carrier.

At block 660 of the process flow 600, computer-executable instructions stored on a memory of a device, such as a remote server, may be executed to determine that the second package identifier is associated with a second shipping carrier. For example, the remote server may determine that the second package identifier is associated with a second shipping carrier. In some instances, a user may select a certain shipping carrier when shipping a package and/or a package may already be labeled with a certain shipping carrier when deposited into the package receptacle. The shipping carrier may therefore be associated with the machine-readable token or second package identifier.

At block 670 of the process flow 200, computer-executable instructions stored on a memory of a device, such as a remote server, may be executed to cause the access door to be unlocked at a second time interval. For example, the remote server may cause the access door to be unlocked at a second time interval. The remote server may determine that the second package is authorized to be deposited into the package receptacle, and may cause the access door to be unlocked. The remote server may send a signal to the package receptacle to unlock the access door or otherwise provide access for a user to deposit the second package.

At block 680 of the process flow 200, computer-executable instructions stored on a memory of a device, such as a remote server, may be executed to generate a second notification that a package for the second shipping carrier is present in the package receptacle. For example, the remote server may generate a second notification that a package for the second shipping carrier is present in the package receptacle. The second notification may be transmitted to an operator of the package receptacle, the shipper, and/or the second shipping carrier.

In this manner, the remote server or other computer system may track inventory of deposited packages and corresponding shipping carriers across a network of carrier-agnostic package receptacles, where such information may be used to optimize pickup routes, drop off location options for shippers, and the like.

Figure 7:
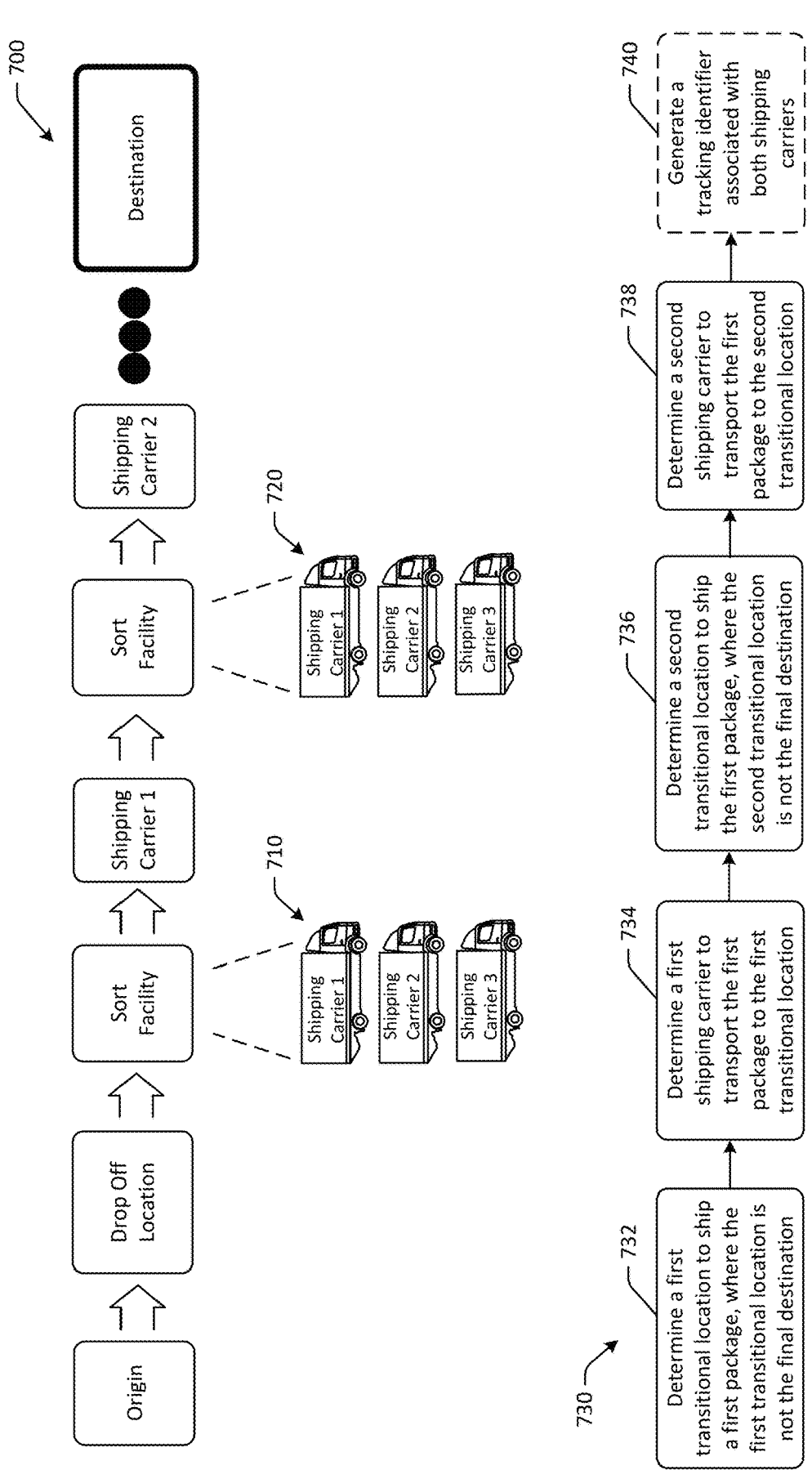
FIG. 7 is a schematic illustration of an example flow for automated ingestion of carrier-agnostic packages and dynamic midmile logistics adjustments in accordance with one or more example embodiments of the disclosure.

FIG. 7 depicts an example flow 700 for automated ingestion of carrier-agnostic packages and dynamic midmile logistics adjustments in accordance with one or more example embodiments of the disclosure. While example embodiments of the disclosure may be described in the context of carrier-agnostic packages, it should be appreciated that the disclosure is more broadly applicable to any type of package. Some or all of the blocks of the process flows in this disclosure may be performed in a distributed manner across any number of devices. The operations of the process flow may be optional and may be performed in a different order.

The example flow 700 depicts a path from an origin of a package, which may be a carrier-agnostic package, to a destination of the package. As discussed at least with respect to FIG. 8, the path a package follows between the origin and destination may optionally be determined and/or optimized using one or more machine learning models.

The package may begin at its origin and may be deposited at a drop off location. The drop off location may be a carrier-agnostic package receptacle or other drop off location. The package may be optionally transported to a sortation facility. In some instances, instead of going to a sort facility, shipping carriers may retrieve packages for injection into their networks directly from a drop off location. For example, a remote server may generate a pickup notification for a third party operator (e.g., associated with a particular shipping carrier, etc.) to retrieve packages from a particular package receptacle.

At the sort facility, the packages may be sorted for injection into the different shipping carrier networks, and the shipping carriers may retrieve the sorted packages. For carrier-agnostic packages, a shipping carrier may be determined to handle a portion of a delivery route for the package. For example, using the model depicted in the example of FIG. 8, a remote server may determine that Shipping Carrier 1 is to be selected from a first set of shipping carriers 710 for transport of the package along a portion of the delivery route. The package may be injected into the shipping network of Shipping Carrier 1 and transported to another sort facility.

At the next sort facility, the remote server may determine that the package is to be injected into the shipping network of Shipping Carrier 2 from a second set of shipping carriers 720 for transport of the package along a subsequent portion of the delivery route. The package may be injected into the shipping network of Shipping Carrier 2 and transported to another sort facility and/or downstream until the package is delivered at its destination.

During the shipping process, the package location may be tracked using a carrier-agnostic package identifier that is associated with different shipping carriers at different points in time. As a result, users can locate the package status of their package regardless of the handler of the package.

A process flow 700 may be executed by one or more computer systems for routing of a carrier-agnostic package to its destination. At block 732, the remote server may determine a first transitional location to ship a first package, where the first transitional location is not the final destination of the package. For example, the first transitional location may be a sortation facility. At block 734, the remote server may determine a first shipping carrier to transport the first package to the first transitional location. The first shipping carrier may be determined using one or more factors, such as cost, speed, capacity, and the like. At block 736, the remote server may determine, based at least in part on the destination, a second transitional location to ship the first package, wherein the second transitional location is not the final destination. For example, the second transitional location may be another sortation facility, a delivery station, or another transitional location. At block 738, the remote server may determine a second shipping carrier to transport the first package to the second transitional location. The second shipping carrier may be determined using one or more factors, such as cost, speed, capacity, and the like. At optional block 740, the remote server may generate a tracking identifier associated with both the first shipping carrier and the second shipping carrier, so as to allow tracking of the package without having to know shipping carrier-specific tracking identifiers in advance.

Figure 8:
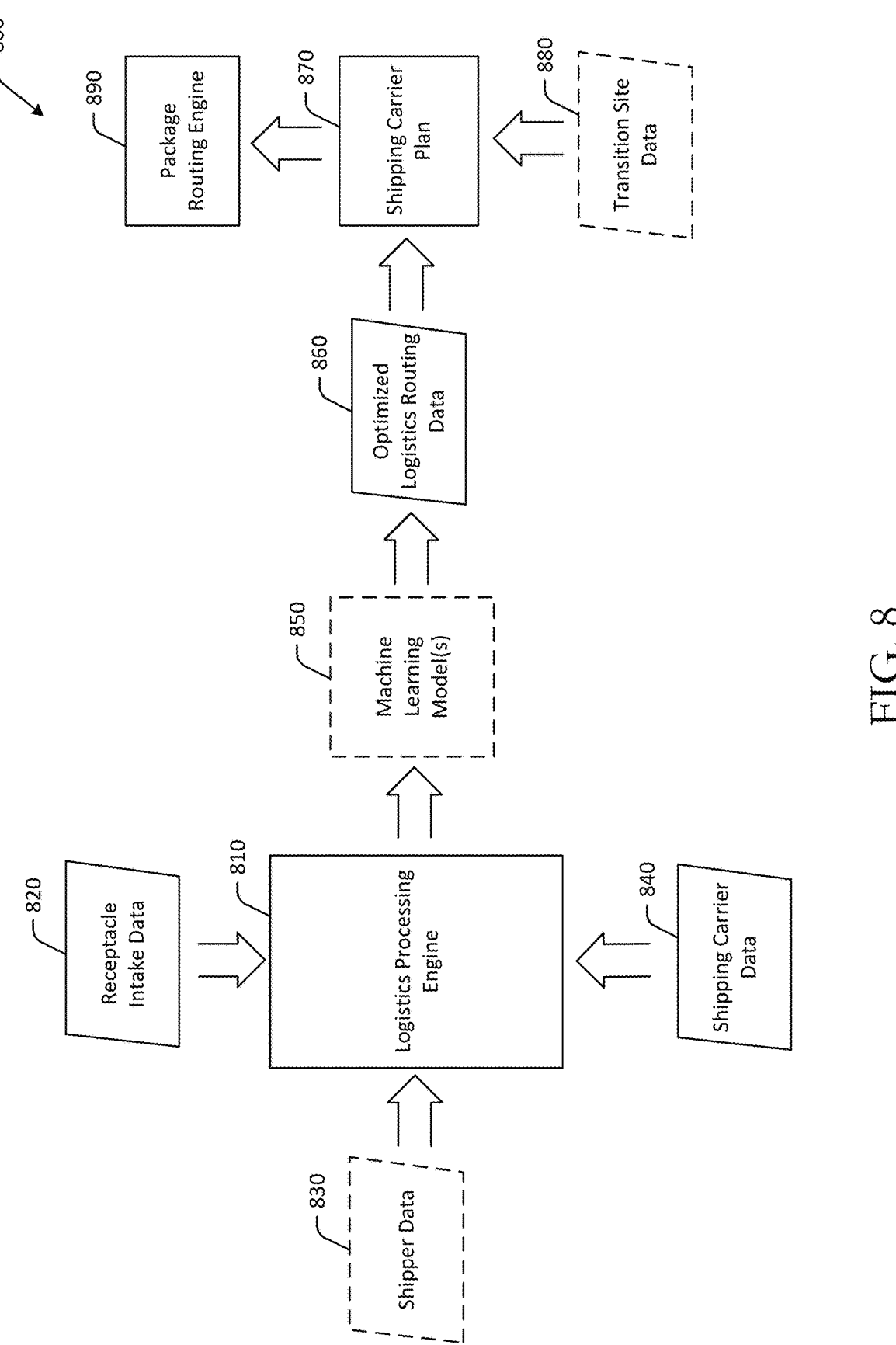
FIG. 8 schematically illustrates an example data flow for automated ingestion of carrier-agnostic packages and dynamic midmile logistics adjustments in accordance with one or more example embodiments of the disclosure.

FIG. 8 schematically illustrates an example data flow for automated ingestion of carrier-agnostic packages and dynamic midmile logistics adjustments in accordance with one or more example embodiments of the disclosure. Different embodiments may include different, additional, or fewer inputs or outputs than those illustrated in the example of FIG. 8.

In FIG. 8, an example data flow 800 is schematically depicted. A logistics processing engine 810 may be stored at and/or executed by one or more remote servers. The logistics processing engine 810 may include one or more modules or algorithms, and may be configured to determine requests for shipping options, including determining shipping costs for individual packages. The logistics processing engine 810 may interact with one or more application programming interfaces to determine shipping carrier rates for delivery of a certain package or group of packages. For example, the logistics processing engine 810 may receive requests for shipping costs and/or requests for machine-readable tokens to access drop off locations from one or more user devices. To determine shipping options and pricing, the logistics processing engine 810 may receive one or more additional data inputs. For example, the logistics processing engine 810 may receive receptacle intake data 820, which may indicate an inventory of packages that have been deposited into certain package receptacles and/or are expected to be deposited into the package receptacles. The receptacle intake data 820 may include the shipping carriers associated with the packages that have been deposited into individual package receptacles.

The logistics processing engine 810 may receive shipping carrier data 840, which may indicate pricing for shipment of packages, expected delivery timeframes, pickup timings at which the shipping carrier operator can retrieve packages from a drop off location (where applicable), and so forth. The logistics processing engine 810 may receive optional shipper data 830, which may include shipper identification data, selected drop off location for packages, an origin of a package, and so forth.

The logistics processing engine 810 may output the available shipping options and costs to an optional machine learning model(s) 850. In some embodiments, the logistics processing engine 810 may option a user-selected shipping option to the machine learning model(s) 850. For example, if the user selected a carrier-agnostic shipping option, the logistics processing engine 810 may output the origin and destination of the package to the machine learning model(s) 850.

The machine learning model(s) 850 may be used to determine a ranking of shipping options and/or an order of presentation of shipping options to be presented to the user. In instances where the user has already selected a shipping option and/or shipping carrier, the machine learning model(s) 850 may be configured to determine an optimal drop off location of the package, a point at which the package is to be injected into the shipping carrier network, a time at which the package should be retrieved from the package receptacle, and/or other data related to handling of the package. In one example, if a certain package receptacle has a majority of packages for a particular shipping carrier, or is expected to have a majority of packages for the particular shipping carrier, the machine learning model(s) 850 may determine that the package receptacle is to be ranked first for presentation to the user, and/or the machine learning model(s) 850 may determine that a discount is to be applied to pricing for shipment of the package should the shipper drop the package off at the package receptacle. In addition, the machine learning model(s) 850 may be used to determine dynamic routing for shipment of packages, including internal routing (e.g., between sortation facilities prior to injection into a shipping carrier network, etc.) and shipping carrier selection (e.g., where more than one shipping carrier is used for delivery of a package, etc.) for example based on weather, shipping carrier capacity, shipping carrier pricing, and the like.

The machine learning model(s) 850 may output optimized logistics routing data 860 that may include an optimized route for handling of the package and a specific point at which the package is to be injected into a shipping carrier network, which may not be directly from a package receptacle or at a sortation facility. For example, the optimized logistics routing data 860 may indicate that the package is to be routed internally between sortation facilities prior to being injected into the shipping carrier network, such as for last mile delivery.

The optimized logistics routing data 860 may be used to generate a shipping carrier plan 870 that may be implemented by one or more remote servers for delivery of the package. The shipping carrier plan 870 may be augmented by optional transition site data 880, which may include data related to load and capacity at a particular transition site, such as a sortation facility or other transition site. The shipping carrier plan 870 may be input into a package routing engine 880 for implementation by one or more remote servers. The package routing engine 880 may generate one or more machine-readable tokens, package identifiers, notifications, and other data associated with a package to route the package from the drop off location to the point of injection into a particular shipping carrier network.

As a result, end-to-end processing of packages, access to package receptacles, and optimization of package handling may be completed in an automated manner. In some embodiments, the system may receive feedback data, where the feedback data includes an indication that a user did not select a first ranked candidate shipping option. The system may use the feedback data associated with the rankings to retrain the machine learning model(s).

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 9:
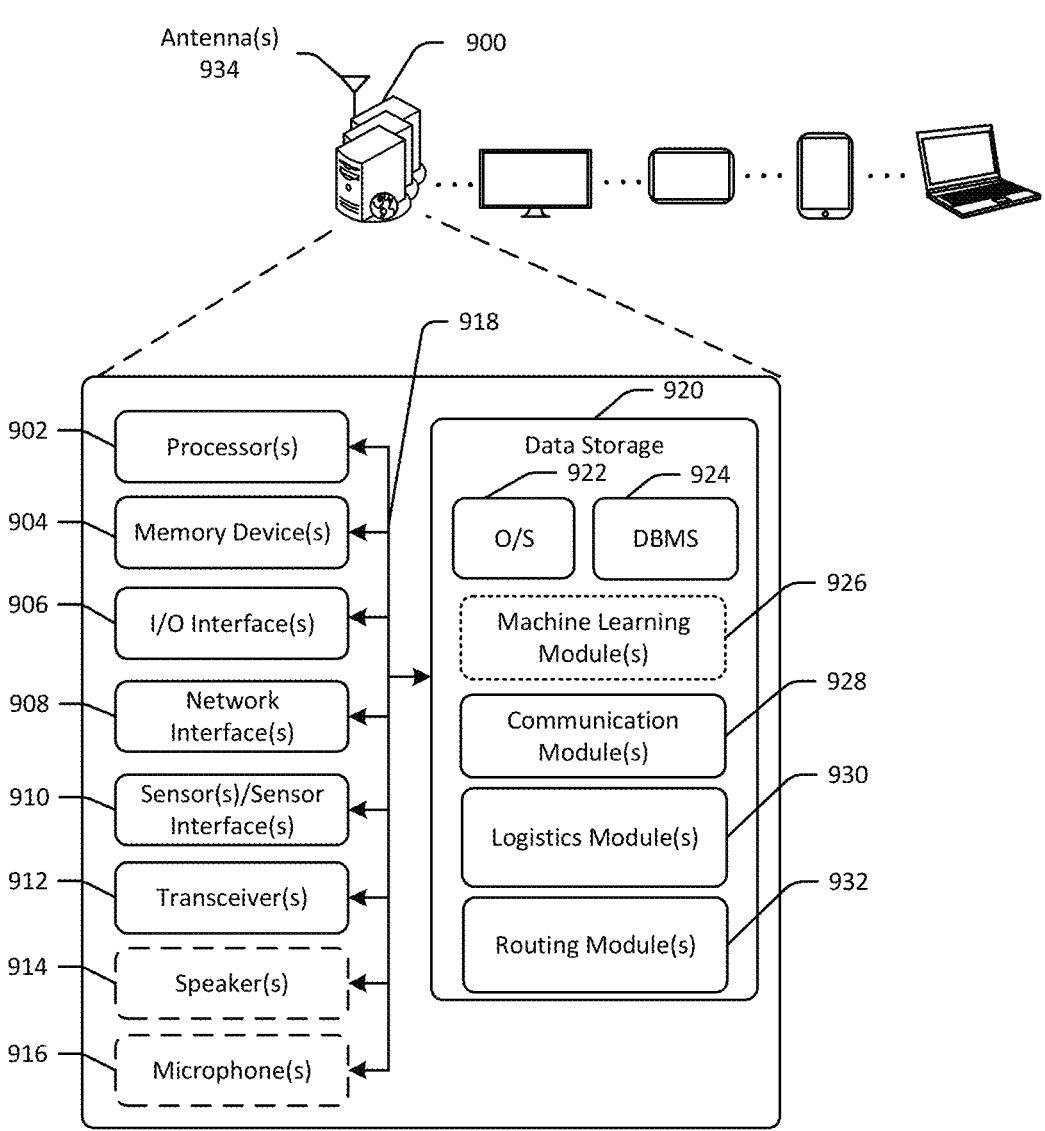
FIG. 9 is a schematic block diagram of an illustrative device in accordance with one or more example embodiments of the disclosure.

FIG. 9 is a schematic block diagram of an illustrative computer system or remote server 900 in accordance with one or more example embodiments of the disclosure. The remote server 900 may include any suitable computing device capable of receiving and/or generating data including, but not limited to, a mobile device such as a smartphone, tablet, e-reader, wearable device, or the like; a desktop computer; a laptop computer; or the like. The remote server 900 may correspond to an illustrative device configuration for the devices and/or controllers of FIGS. 1-8.

The remote server 900 may be configured to communicate via one or more networks with one or more servers, application programming interfaces, user devices, or the like. In some embodiments, a single remote server or single group of remote servers may be configured to perform more than one type of correlation and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 900 may include one or more processors (processor(s)) 902, one or more memory devices 904 (generically referred to herein as memory 904), one or more input/output (I/O) interface(s) 906, one or more network interface(s) 908, one or more sensors or sensor interface(s) 910, one or more transceivers 912, one or more optional speakers 914, one or more optional microphones 916, and data storage 920. The remote server 900 may further include one or more buses 918 that functionally couple various components of the remote server 900. The remote server 900 may further include one or more antenna(s) 934 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit exchange of information (e.g., data (including computer-executable code), signaling, etc.) between various components of the remote server 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 904 of the remote server 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to memory 904 for use by the processor(s) 902 during the execution of the computer-executable instructions. Moreover, output data generated as a result of execution of the computer-executable instructions by the processor(s) 902 may be stored initially in memory 904, and may ultimately be copied to data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like such as, for example, one or more optional machine learning module(s) 926, one or more communication module(s) 928, one or more logistics module(s) 930, and/or one or more routing module(s) 932. Some or all of these module(s) may be sub-module(s). Any of the components depicted as being stored in data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in data storage 920 may support functionality described in reference to correspondingly named components earlier in this disclosure.

The data storage 920 may further store various types of data utilized by components of the remote server 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 9, the datastore(s) may include, for example, user preference information, customer and/or user account information, shipping carrier information, and other information.

The processor(s) 902 may be configured to access the memory 904 and execute computer-executable instructions loaded therein. For example, the processor(s) 902 may be configured to execute computer-executable instructions of the various program module(s), applications, engines, or the like of the remote server 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program module(s) depicted in FIG. 9, the machine learning module(s) 926 may include computer-executable instructions, code, or the like that responsive to execution by one or more of the processor(s) 902 may perform functions including, but not limited to, determining training data sets, determining model accuracy, generating one or more machine learning models or algorithms, determining optimized shipping carrier assignments, determining package routing, and the like.

The communication module(s) 928 may include computer-executable instructions, code, or the like that responsive to execution by one or more of the processor(s) 902 may perform functions including, but not limited to, communicating with one or more devices, for example, via wired or wireless communication, communicating with remote servers, communicating with remote datastores, sending or receiving notifications or drop off location data, communicating with standalone package receptacles, and the like.

The logistics module(s) 930 may include computer-executable instructions, code, or the like that responsive to execution by one or more of the processor(s) 902 may perform functions including, but not limited to, determining current package receptacle inventory data, determining or analyzing authentication data, identifying package receptacles and/or generating package identifiers or tracking codes, and the like.

The routing module(s) 932 may include computer-executable instructions, code, or the like that responsive to execution by one or more of the processor(s) 902 may perform functions including, but not limited to, determining shipping carrier or pickup routing, aggregating package receptacle data, generating digital package data, and the like.

Referring now to other illustrative components depicted as being stored in the data storage 920, the O/S 922 may be loaded from the data storage 920 into the memory 904 and may provide an interface between other application software executing on the remote server 900 and hardware resources of the remote server 900. More specifically, the O/S 922 may include a set of computer-executable instructions for managing hardware resources of the remote server 900 and for providing common services to other application programs (e.g., managing memory allocation among various application programs). The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 900 is a mobile device, the DBMS 924 may be any suitable light-weight DBMS optimized for performance on a mobile device.

Referring now to other illustrative components of the remote server 900, the input/output (I/O) interface(s) 906 may facilitate the receipt of input information by the remote server 900 from one or more I/O devices as well as the output of information from the remote server 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(s) 934 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 900 may further include one or more network interface(s) 908 via which the remote server 900 may communicate with any of a variety of other systems, platforms, networks, devices, and so forth. The network interface(s) 908 may enable communication, for example, with one or more wireless routers, one or more host servers, one or more web servers, and the like via one or more of networks.

The antenna(s) 934 may include any suitable type of antenna depending, for example, on the communications protocols used to transmit or receive signals via the antenna (s) 934. Non-limiting examples of suitable antennas may include directional antennas, non-directional antennas, dipole antennas, folded dipole antennas, patch antennas, multiple-input multiple-output (MIMO) antennas, or the like. The antenna(s) 934 may be communicatively coupled to one or more transceivers 912 or radio components to which or from which signals may be transmitted or received.

As previously described, the antenna(s) 934 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 934 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 934 may be configured to transmit or receive radio frequency signals within any suitable frequency range forming part of the unlicensed portion of the radio spectrum.

The antenna(s) 934 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(s) 934—transmitting or receiving radio frequency (RF) signals in the bandwidth and/or channels corresponding to the communications protocols utilized by the remote server 900 to communicate with other devices. The transceiver(s) 912 may include hardware, software, and/or firmware for modulating, transmitting, or receiving—potentially in cooperation with any of antenna(s) 934—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the remote server 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 914 may be any device configured to generate audible sound. The optional microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the remote server 900 may include alternate and/or additional hardware, software, or firmware components beyond those described or depicted without departing from the scope of the disclosure. More particularly, it should be appreciated that software, firmware, or hardware components depicted as forming part of the remote server 900 are merely illustrative and that some components may not be present or additional components may be provided in various embodiments. While various illustrative program module(s) have been depicted and described as software module(s) stored in data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module (s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A package receptacle comprising:
an access door;
memory comprising computer-executable instructions; and
one or more computer processors configured to access the memory and execute the computer-executable instructions to:
determine a first package identifier for a first package to be deposited into the package receptacle, wherein the first package identifier is not a shipping carrier identifier;
determine that the first package identifier is associated with a first shipping carrier;
determine, based at least in part on the first package identifier, a destination address;
generate, based at least in part on the first package identifier, a barcode associated with the first shipping carrier and the destination address;
determine a first request to unlock the access door, wherein the first request comprises a first user identifier;
determine that the first user identifier is authorized to access the package receptacle;
send, based at least in part on determining that the first user identifier is authorized to access the package receptacle, a control signal to a lock associated with the access door;
cause the access door to be unlocked at a first time interval responsive to the control signal;
generate a first notification that a package for the first shipping carrier is present in the package receptacle;
generate a first machine-readable code associated with the first shipping carrier, wherein the first machine-readable code permits access to the package receptacle;
determine a second package identifier for a second package to be deposited into the package receptacle;

determine that the second package identifier is associated with a second shipping carrier;
generate a second notification that a package for the second shipping carrier is present in the package receptacle;
generate a second machine-readable code associated with the second shipping carrier, wherein the second machine-readable code permits access to the package receptacle;
determine a third package identifier for a third package to be deposited into the package receptacle, wherein the third package identifier is associated with a first shipping carrier at a first time interval and a second shipping carrier at a second time interval;
determine that the third package identifier is not associated with a shipping carrier;
generate a notification that the third package identifier is not associated with a shipping carrier;
dynamically select a third shipping carrier from a set of shipping carriers for the third package identifier;
cause the third package identifier to be associated with the third shipping carrier;
generate a third notification that a package for the second shipping carrier is present in the package receptacle;
generate a third machine-readable code associated with the third shipping carrier, wherein the third machine-readable code permits access to the package receptacle.

2. The package receptacle of claim 1, wherein the one or more computer processors are further configured to access the memory and execute the computer-executable instructions to:
cause the first package to be routed to a first container in the package receptacle, wherein the first machine-readable code permits access only to the first container; and
cause the second package to be routed to a second container in the package receptacle, wherein the second machine-readable code permits access only to the second container.

3. The package receptacle of claim 2, wherein the one or more computer processors are further configured to access the memory and execute the computer-executable instructions to:
determine a first access request to access the package receptacle, the first access request comprising the first machine-readable code; and
permit access to the first container.

4. The package receptacle of claim 1, further comprising:
a printer configured to generate a shipping label comprising the destination address and the barcode.

5. The package receptacle of claim 1, wherein the one or more computer processors are further configured to access the memory and execute the computer-executable instructions to:
determine a second request to unlock the access door, wherein the second request comprises a second user identifier;
determine that the second user identifier is authorized to access the package receptacle; and
cause the access door to be unlocked at a second time interval.

6. The package receptacle of claim 1, wherein the first shipping carrier is different from the second shipping carrier.

7. The package receptacle of claim 1, further comprising:

a sensor configured to determine the first package identifier;

a solar panel; and a display configured to receive touch input.

8. The package receptacle of claim 1, wherein the package receptacle is a standalone package receptacle disposed in an outdoors environment.

9. The package receptacle of claim 6, wherein the third shipping carrier is different from the second shipping carrier.

10. The package receptacle of claim 1, wherein the first machine-readable code is wirelessly transmitted to the package receptacle.

11. A system comprising:

memory comprising computer-executable instructions; and one or more computer processors configured to access the memory and execute the computer-executable instructions to:

determine a first package identifier for a first package to be deposited into a package receptacle, wherein the first package identifier is not a shipping carrier identifier;

determine that the first package identifier is associated with a first shipping carrier;

determine, based at least in part on the first package identifier, a destination address;

generate, based at least in part on the first package identifier, a barcode associated with the first shipping carrier and the destination address;

determine a first request to unlock an access door of the package receptacle, wherein the first request comprises a first user identifier;

determine that the first user identifier is authorized to access the package receptacle;

send, based at least in part on determining that the first user identifier is authorized to access the package receptacle, a control signal to a lock associated with the access door;

cause the access door to be unlocked at a first time interval responsive to the control signal;

generate a first notification that a package for the first shipping carrier is present in the package receptacle;

generate a first machine-readable code associated with the first shipping carrier, wherein the first machine-readable code permits access to the package receptacle;

determine a second package identifier for a second package to be deposited into the package receptacle;

determine that the second package identifier is associated with a second shipping carrier;

generate a second notification that a package for the second shipping carrier is present in the package receptacle;

generate a second machine-readable code associated with the second shipping carrier, wherein the second machine-readable code permits access to the package receptacle;

determine a third package identifier for a third package to be deposited into the package receptacle, wherein the third package identifier is associated with a first shipping carrier at a first time interval and a second shipping carrier at a second time interval;

determine that the third package identifier is not associated with a shipping carrier;

generate a notification that the third package identifier is not associated with a shipping carrier;

dynamically select a third shipping carrier from a set of shipping carriers for the third package identifier;

cause the third package identifier to be associated with the third shipping carrier;

generate a third notification that a package for the second shipping carrier is present in the package receptacle;

generate a third machine-readable code associated with the third shipping carrier, wherein the third machine-readable code permits access to the package receptacle.

12. The system of claim 11, wherein the one or more computer processors are further configured to access the memory and execute the computer-executable instructions to:

cause the first package to be routed to a first container in the package receptacle, wherein the first machine-readable code permits access only to the first container; and cause the second package to be routed to a second container in the package receptacle, wherein the second machine-readable code permits access only to the second container.

13. The system of claim 12, wherein the one or more computer processors are further configured to access the memory and execute the computer-executable instructions to:

determine a first access request to access the package receptacle, the first access request comprising the first machine-readable code; and permit access to the first container.

14. The system of claim 11, wherein the one or more computer processors are further configured to access the memory and execute the computer-executable instructions to:

determine a second request to unlock the access door, wherein the second request comprises a second user identifier;

determine that the second user identifier is authorized to access the package receptacle; and cause the access door to be unlocked at a second time interval.

15. The system of claim 11, wherein the first shipping carrier is different from the second shipping carrier.

16. The system of claim 15, wherein the third shipping carrier is different from the second shipping carrier.

17. The system of claim 11, wherein the package receptacle is a standalone package receptacle disposed in an outdoors environment.

18. The system of claim 11, wherein the first machine-readable code is wirelessly transmitted to the package receptacle.

* * * * *